(12) United States Patent
Li et al.

(10) Patent No.: US 11,874,521 B2
(45) Date of Patent: Jan. 16, 2024

(54) CAMERA MODULE AND PERISCOPE CAMERA LENS

(71) Applicant: AAC Optics Solutions Pte. Ltd., Singapore (SG)

(72) Inventors: Linzhen Li, Shenzhen (CN); Zhuming Chu, Shenzhen (CN); Tongming Xu, Shenzhen (CN); Houwei Zhao, Shenzhen (CN); Kai Chen, Shenzhen (CN)

(73) Assignee: AAC Optics Solutions Pte. Ltd., Singapore (SG)

( * ) Notice: Subject to any disclaimer, the term of this patent is extended or adjusted under 35 U.S.C. 154(b) by 719 days.

(21) Appl. No.: 16/941,563

(22) Filed: Jul. 29, 2020

(65) Prior Publication Data

US 2020/0379207 A1 Dec. 3, 2020

Related U.S. Application Data

(63) Continuation of application No. PCT/CN2019/089730, filed on Jun. 1, 2019.

(51) Int. Cl.
*G02B 7/04* (2021.01)
*G02B 27/64* (2006.01)
(Continued)

(52) U.S. Cl.
CPC ............... *G02B 7/04* (2013.01); *G02B 23/08* (2013.01); *G02B 27/646* (2013.01); *G03B 3/10* (2013.01);
(Continued)

(58) Field of Classification Search
None
See application file for complete search history.

(56) References Cited

U.S. PATENT DOCUMENTS 11,609,436 B2\* 3/2023 Seo .................. G03B 17/17
2009/0097834 A1\* 4/2009 Jang .................. H04N 23/54
348/208.1
(Continued)

FOREIGN PATENT DOCUMENTS

CN 103685927 A 3/2014
CN 103765309 A 4/2014
(Continued)

*Primary Examiner* — Derek S. Chapel
(74) *Attorney, Agent, or Firm* — W&G Law Group

(57) ABSTRACT

Provided is a camera module, including: a shell; a lens assembly movable relative to the shell; a focusing and driving assembly; an image stabilization and driving assembly; and a supporting and guiding assembly for supporting the lens assembly and guide a movement of the lens assembly. The supporting and guiding assembly comprises a first magnetic portion fixed to the lens assembly, a second magnetic portion fixed to the shell and spaced from and opposite to the first magnetic portion, and a ball provided between the first magnetic portion and the second magnetic portion. The lens assembly is connected to the shell through the supporting and guiding assembly in a rollable way. According to the present invention, the ball is arranged between the first magnetic portion and the second magnetic portion to guide the lens assembly to achieve restoration, thereby saving an inner space and facilitating assembling thereof.

6 Claims, 6 Drawing Sheets

(51) Int. Cl.
  *G03B 13/34* (2021.01)
  *G03B 5/02* (2021.01)
  *G03B 3/10* (2021.01)
  *G03B 17/17* (2021.01)
  *G02B 23/08* (2006.01)
  *G03B 5/00* (2021.01)

(52) U.S. Cl.
  CPC ........... *G03B 5/00* (2013.01); *G03B 5/02* (2013.01); *G03B 13/34* (2013.01); *G03B 17/17* (2013.01); *G03B 2205/0007* (2013.01); *G03B 2205/0015* (2013.01); *G03B 2205/0069* (2013.01)

(56) References Cited

U.S. PATENT DOCUMENTS

| 2014/0218551 | A1* | 8/2014 | Muramatsu | G03B 5/02 348/208.6 |
| 2017/0108705 | A1* | 4/2017 | Yu | G02B 7/09 |
| 2018/0109660 | A1* | 4/2018 | Yoon | H04N 23/55 |
| 2018/0364450 | A1* | 12/2018 | Lee | H04N 23/55 |
| 2019/0346653 | A1* | 11/2019 | Kang | G02B 7/026 |
| 2020/0409171 | A1* | 12/2020 | Xu | G02B 27/646 |

FOREIGN PATENT DOCUMENTS

| CN | 104950419 A | 9/2015 |
| CN | 207424496 U | 5/2018 |
| CN | 108141518 A | 6/2018 |
| JP | 2006215122 A | 8/2006 |
| JP | 2008076646 A | 4/2008 |
| JP | 2018010295 A | 1/2018 |
| WO | 2011142153 A1 | 11/2011 |

* cited by examiner

CAMERA MODULE AND PERISCOPE CAMERA LENS

TECHNICAL FIELD

The present invention relates to the field of periscope cameras, and more particularly, to a camera module and a periscope camera lens using the camera module.

BACKGROUND

A periscope camera lens generally includes a camera module and a prism module provided at a side of the camera module. In the related art, the lens has an auto-focusing function and an optical image stabilization function, and supporting and restoration of the lens are generally achieved by a suspension wire, which occupies a large space and is inconvenient in terms of assembling.

Therefore, it is needed to provide a camera module which has a small supporting and guiding assembly and is convenient in terms assembling.

SUMMARY

The present invention aims to provide a camera module which has a small supporting and guiding assembly and is convenient in terms assembling.

Technical solutions of the present invention will be described as follows.

A camera module is provided, including: a shell having a receiving cavity; a lens assembly provided in the receiving cavity and movable relative to the shell; at least one focusing and driving assembly provided in the receiving cavity and configured to drive the lens assembly to move in a direction of an optical axis; at least one image stabilization and driving assembly provided in the receiving cavity and configured to drive the lens assembly to move in a first direction perpendicular to the optical axis; and at least one supporting and guiding assembly provided in the receiving cavity and configured to support the lens assembly and guide a movement of the lens assembly. Each of the at least one supporting and guiding assembly includes a first magnetic portion fixed to the lens assembly, a second magnetic portion fixed to the shell and spaced from and opposite to the first magnetic portion, and a ball provided between the first magnetic portion and the second magnetic portion. The lens assembly is connected to the shell through the at least one supporting and guiding assembly in a rollable way. The first magnetic portion and the second magnetic portion mutually attract in a direction perpendicular to the optical axis and the first direction in such a manner that the lens assembly is suspended in the receiving cavity. The ball is rollable between the first magnetic portion and the second magnetic portion to guide the lens assembly.

As an improvement, an avoiding groove is formed by recessing from a side of the first magnetic portion and/or the second magnetic portion close to the ball along a direction facing away from the ball, and the ball is received in the avoiding groove and is rollable in the avoiding groove.

As an improvement, the first magnetic portion includes a first supporting portion fixed to the lens assembly and a first magnet embedded into the first supporting portion. The second magnetic portion includes a second supporting portion fixed to the shell and a second magnet embedded into the second supporting portion. The ball is arranged between the first supporting portion and the second supporting portion, and the avoiding groove is formed in the first supporting portion and/or the second supporting portion.

As an improvement, the at least one supporting and guiding assembly includes an even number of supporting and guiding assemblies, which are equally divided into two groups of supporting and guiding assemblies, and the two groups of supporting and guiding assemblies are symmetrically distributed at two sides of a central axis of the lens assembly.

As an improvement, each of the first magnet and the second magnet has a cylindrical shape, and in an initial state, both a central axis of the first magnet and a central axis of the second magnet pass through a center of the ball and are perpendicular to the optical axis of the lens assembly.

As an improvement, the lens assembly includes a bracket spaced apart from the shell and a lens module mounted to the bracket, and the first magnetic portion is fixed to the bracket.

As an improvement, the first supporting portion is formed on the bracket and formed into one piece with the bracket, and/or the second supporting portion is formed on the shell.

As an improvement, the bracket includes supporting arms that are opposite to and spaced apart from each other in the first direction, and bottom arms connected between the supporting arms, and the lens module is supported by the bottom arms and is located between the supporting arms As an improvement, a first receiving groove is formed by recessing from a side of each of the supporting arms facing away from the second magnetic portion, and each of the at least one image stabilization and driving assembly includes: a first magnetic block fixed to the first receiving groove, and a first coil fixed to the shell; and the first coil cooperates with the first magnetic block to drive the lens assembly to move in the first direction; and/or the at least one image stabilization and driving assembly includes two image stabilization driving assemblies that are symmetrically distributed at two sides of a central axis of the lens assembly.

As an improvement, a second receiving groove is formed by recessing from a side of each of the supporting arms facing away from the lens module, and each of the at least one focusing and driving assembly includes: a second magnetic block fixed to the second receiving groove, and a second coil fixed to the shell; and the second coil cooperates with the second magnetic block to drive the lens assembly to move along the optical axis of the lens assembly; and/or the at least one focusing and driving assembly includes two focusing and driving assemblies that are symmetrically distributed at both sides of the central axis of the lens assembly.

The present invention further provides a periscope camera lens, including: the camera module as descried above, and a prism module provided at an end of the camera module.

The present invention has following beneficial effects. The first magnetic portion is fixed to the lens assembly, the second magnetic portion is fixed to the shell, and the ball is arranged between the first magnetic portion and the second magnetic portion. In this case, when the lens assembly moves, the ball will be located between the first magnetic portion and the second magnetic portion under an action of a magnetic field, so that the first magnetic portion drives the lens assembly to restore, thereby saving an inner space and facilitating assembling thereof.

BRIEF DESCRIPTION OF DRAWINGS

Many aspects of the exemplary embodiment can be better understood with reference to the following drawings. The components in the drawings are not necessarily drawn to FIG. 1 is a schematic diagram of a structure of a periscope camera lens according to an embodiment of the present invention.

Figure 1:
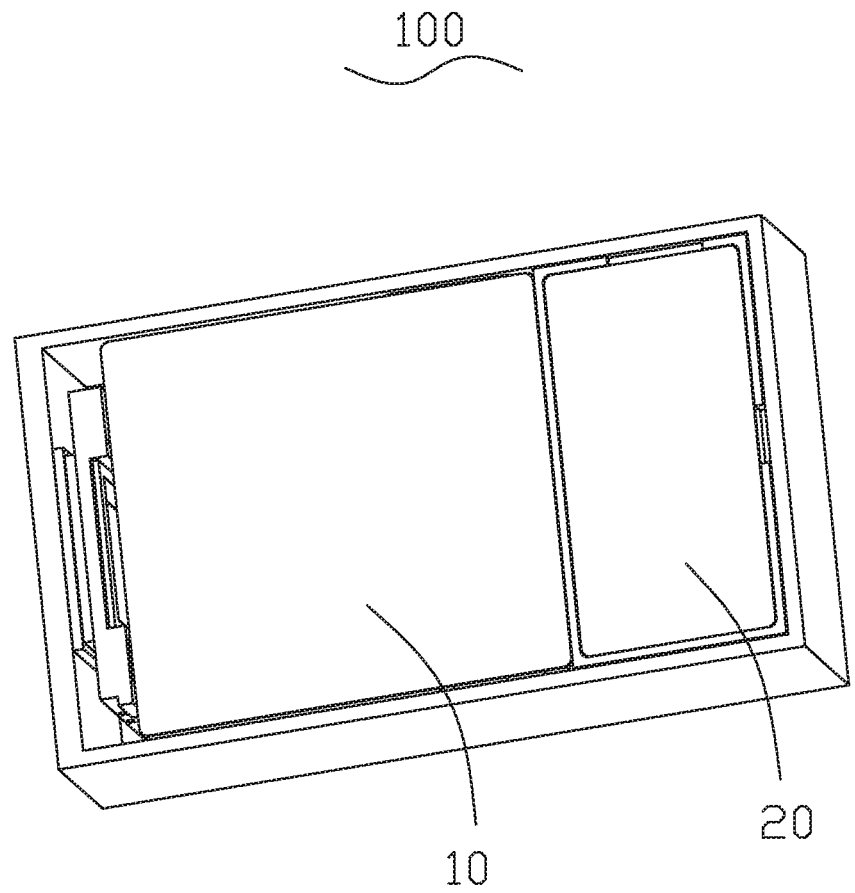

100. periscope camera lens; 10. camera module; 1. shell; 11. receiving cavity; 2. lens assembly; 21. lens module; 22. bracket; 3. supporting and guiding assembly; 31. first magnetic portion; 32. second magnetic portion; 33. ball; 220. avoiding groove; 311. first supporting portion; 312. first magnet; 321. second supporting portion; 322. second magnet; 221. supporting arm; 222. bottom arm; 223. first receiving groove; 224. second receiving groove; 41. image stabilization and driving assembly; 411. first coil; 412. first magnetic block; 42. focusing and driving assembly; 421. second coil; 422. second magnetic block; 20. prism module.

DESCRIPTION OF EMBODIMENTS

The present invention will be further described in the following with reference to the accompany drawings and embodiments.

A camera module 10 is provided. With reference to FIG. 1 to FIG. 6, the camera module 10 includes a shell 1 having a receiving cavity 11, a lens assembly 2 provided in the receiving cavity 11 and movable relative to the shell 1, a focusing and driving assembly 42 provided in the receiving cavity 11 for driving the lens assembly 2 to move in a direction of an optical axis, an image stabilization and driving assembly 41 provided in the receiving cavity 11 for driving the lens assembly 2 to move in a first direction perpendicular to the optical axis, and a supporting and guiding assembly 3 provided in the receiving cavity 11 for supporting the lens assembly 2 and guiding a movement of the lens assembly 2. The supporting and guiding assembly 3 includes a first magnetic portion 31 fixed to the lens assembly 2, a second magnetic portion 32 fixed to the shell 1 and spaced apart from and opposite to the first magnetic portion 31, and a ball 33 provided between the first magnetic portion 31 and the second magnetic portion 32. The lens assembly 2 is connected to the shell 1 via the supporting and guiding assembly 3 in a rollable way. The first magnetic portion 31 and the second magnetic portion 32 mutually attract in a direction perpendicular to the optical axis and the first direction, in such a manner that the lens assembly 2 is suspended in the receiving cavity 11. The ball 33 is sandwiched between the first magnetic portion 31 and the second magnetic portion 32 and is rollable between the first magnetic portion 31 and the second magnetic portion 32 to guide the lens assembly 2.

The first magnetic portion 31 and the second magnetic portion 32 attract each other to form a magnetic spring, and the ball 33 plays a supporting and guiding role. In an example, when the lens assembly 2 moves along the optical axis or the first direction during operation, the first magnetic portion 31 follows the lens assembly 2 to move in such a manner that the first magnetic portion 31 is misaligned with the second magnetic portion 32, thereby producing a restoring force. When restoring, the first magnetic portion 31 moves under a mutual magnetic force formed between the first magnetic portion 31 and the second magnetic portion 32, and the ball 33 is a magnetic ball and located at a center of the two magnetic portions under an action of a magnetic field. In this way, the ball 33 will not be stuck at an edge.

Figure 4:
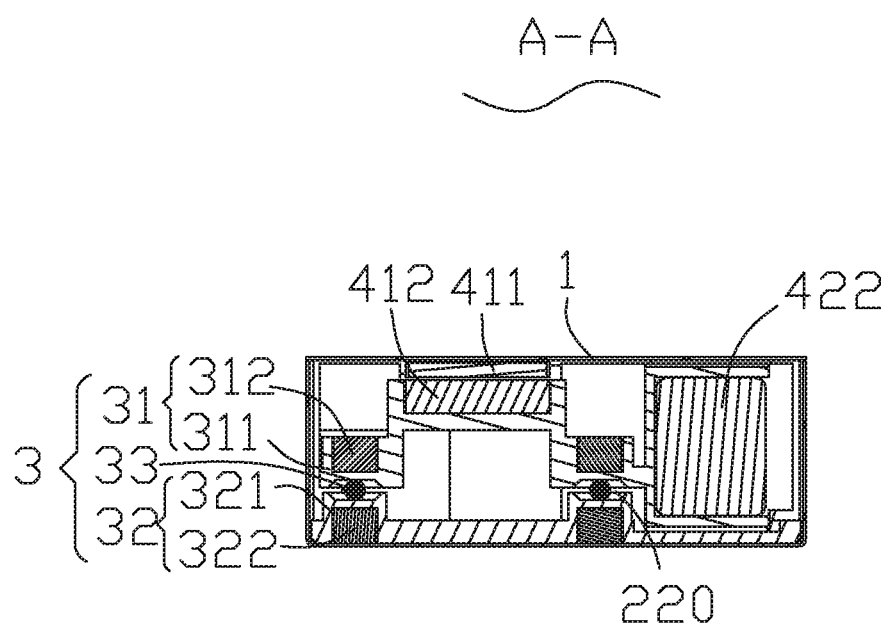
FIG. 4 is a schematic cross-sectional view of the camera module shown in FIG. 2 along line A-A (a direction indicated by an arrow is a cutting direction)

In an example, with reference to FIG. 4, an avoiding groove 220 is formed by recessing from a side of the first magnetic portion 31 and/or the second magnetic portion 32 close to the ball 33 along a direction facing away from the ball 33, and the ball 33 is received in the avoiding groove 220 and is rollable in the avoiding groove 220.

The avoiding groove 220 plays a role in limiting a rollable range of the ball 33. It can be understood that the avoiding groove 220 also plays a role in limiting rolling of the lens assembly 2. The avoiding groove 220 may be formed in the first magnetic portion 31 and/or the second magnetic portion 32.

Figure 5:
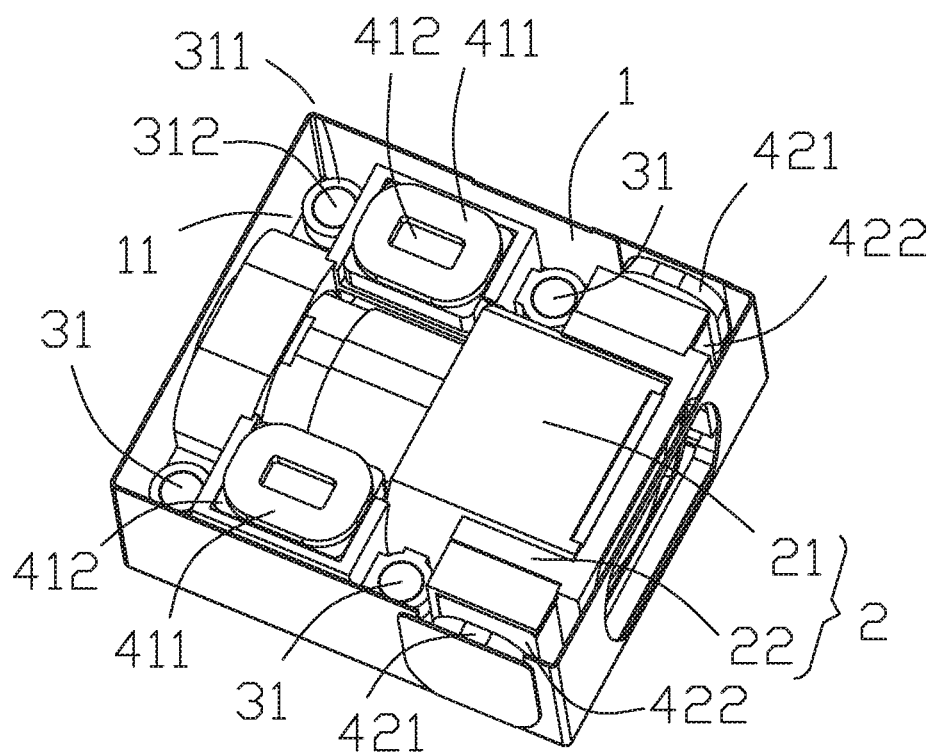
FIG. 5 is a schematic diagram of an internal structure of the camera module shown in FIG. 2.

In an example, with reference to FIG. 5, the first magnetic portion 31 includes a first supporting portion 311 fixed to the lens assembly 2, and a first magnet 312 embedded into the first supporting portion 311. The second magnetic portion 32 includes a second supporting portion 321 fixed to the shell 1, and a second magnet 322 embedded into the second supporting portion 312. The ball 33 is sandwiched between the first supporting portion 311 and the second supporting portion 321. The avoiding groove 220 is formed in the first supporting portion 311 and/or the second supporting portion 321.

The first supporting portion 311 is for use in mounting of the first magnet 312, and the second supporting portion 321 is for use in mounting of the second magnet 322. The first supporting portion 311 and the second supporting portion 321 are both fixed to the lens assembly 2. The avoiding groove 220 can be formed in the first supporting portion 311 and/or the second supporting portion 321.

An even number of supporting and guiding assemblies 3 are provided. All the supporting and guiding assemblies 3 are equally divided into two groups, and the two groups of supporting and guiding assemblies 3 are symmetrically distributed at two sides of a central axis of the lens assembly 2.

The two groups of supporting and guiding assemblies 3 are distributed symmetrically, so that the two sides of the lens assembly 2 can be stressed uniformly. In an example, four supporting and guiding assemblies 3 are provided, and each side of the lens assembly 2 is provided with two of the four support assemblies 3.

Figure 6:
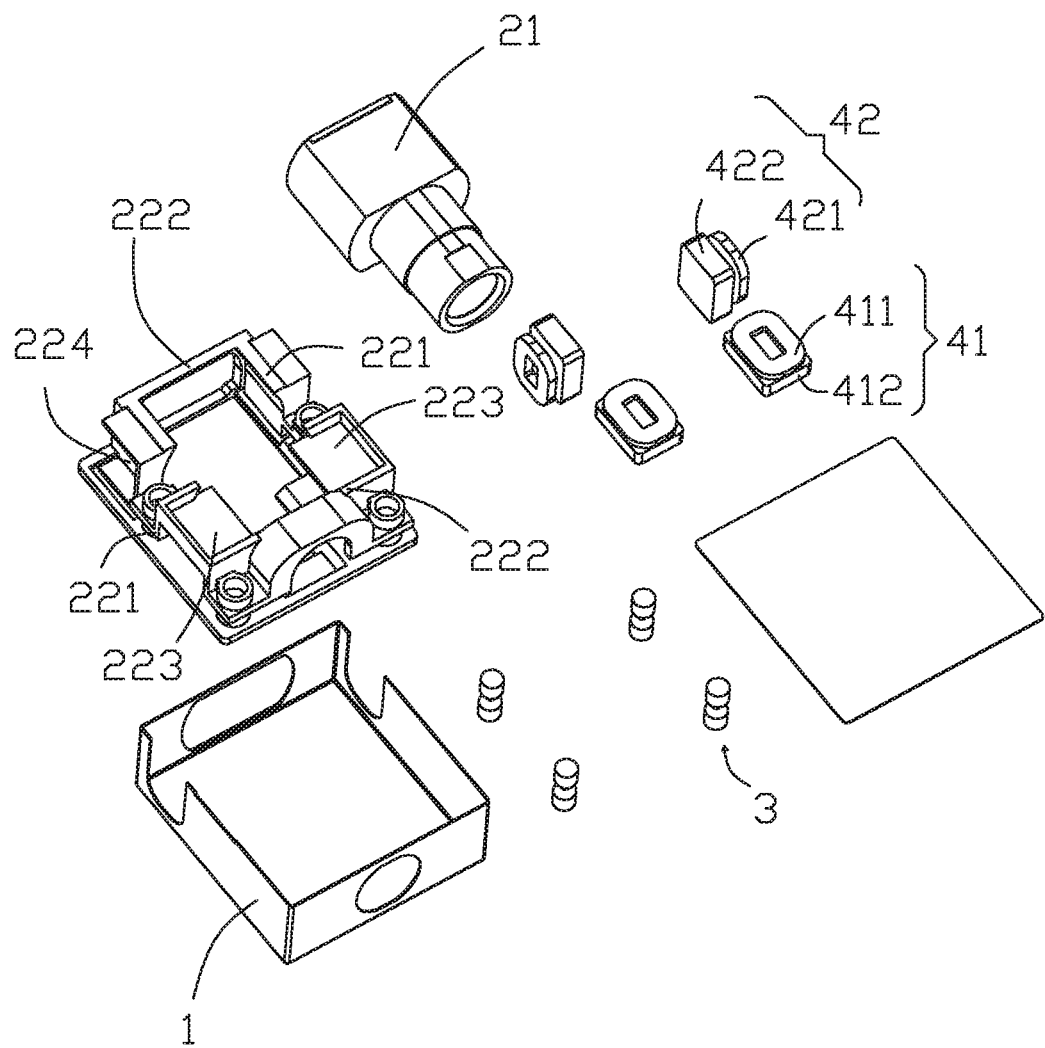
FIG. 6 is a schematic explosive view of the camera module shown in FIG. 2.

In an example, with reference to FIG. 6, each of the first magnet 312 and the second magnet 322 has a cylindrical shape, and in an initial state, both a central axis of the first magnet 312 and a central axis of the second magnet 322 pass through a center of the ball 33 and are perpendicular to the direction of the optical axis of the lens assembly 2.

The magnet in the cylindrical shape can guarantee isotropic restoring rigidity. Both the central axis of the first magnet 312 and the central axis of the second magnet 322 are perpendicular to a direction of a movement of the lens assembly 2. Therefore, it can be understood that, a restoring force of the first magnet 312 and the second magnet 322 is parallel to the direction of the movement of the lens assembly 2.

In an example, with reference to FIG. 6, the lens assembly 2 includes a bracket 22 spaced apart from the shell 1, and a lens module 21 mounted to the bracket 22. The first magnetic portion 31 is fixed to the bracket 22.

In an example, the first supporting portion 311 is formed on the bracket 22 and formed into one piece with the bracket 22, and/or the second supporting portion 321 is formed on the shell 1.

The bracket 22 is for use in mounting of the lens module 21, and the first supporting portion 311 and the second supporting portion 321 are formed into one piece with the bracket 22 to achieve the more stable connection.

In an example, the bracket 22 includes supporting arms 221 spaced apart from and opposite to each other in the first direction, and bottom arms 222 connected between the supporting arms 221. The lens module 21 is supported by the bottom arms 222 and is located between the supporting arms 221.

One supporting arm 221, one bottom arm 222, the other supporting arm 221, and the other bottom arm 222 are connected sequentially to form a frame shape. The bottom arm 222 functions to fix the lens module 21, and the supporting arm 221 functions to limit the lens module 21.

In an example, with reference to FIG. 5 and FIG. 6, a first receiving groove 223 is formed by recessing from a side of the supporting arm 221 facing away from the second magnetic portion 32, and the image stabilization and driving assembly 41 includes: a first magnetic block 412 fixed to the first receiving groove 223, and a first coil 411 fixed to the shell 1. The first coil 411 cooperates with the first magnetic block 412 to drive the lens assembly 2 to move in the first direction; and/or two image stabilization driving assemblies 41 are provided, and the two image stabilization driving assemblies 41 are symmetrically distributed at two sides of the central axis of the lens assembly 2.

In an example, two image stabilization driving assemblies 41 are provided, and the first coil 411 is parallel to the first magnetic block 412. The first coil 411 has a runway shape, and the central axis of the first coil 411 is perpendicular to a cavity bottom of the receiving cavity 11. The first coil 411 is energized to generate a magnetic field, and a force perpendicular to the optical axis of the lens assembly 2 is generated for the first magnetic block 412, thereby driving the lens assembly 2 to move while achieving image stabilization.

In an example, with reference to FIG. 6, a second receiving groove 224 is formed by recessing from a side of the supporting arm 221 facing away from the lens module 2, and the focusing and driving assembly 42 includes a second magnetic block 422 fixed to the second receiving groove 224, and a second coil 421 fixed to the shell 1. The second coil 421 cooperates with the second magnetic block 422 to drive the lens assembly 2 to move along the direction of the optical axis of the lens assembly 2; and/or two focusing and driving assemblies 42 are provided, and the two focusing and driving assemblies 42 are symmetrically distributed at two sides of the central axis of the lens assembly 2.

In an example, two focusing and driving assemblies 42 are provided, and the second coil 421 is parallel to the second magnetic block 422. The second coil 421 has a runway shape, and the central axis of the second coil 421 is parallel to a cavity bottom of the receiving cavity 11. The second coil 421 is energized to generate a magnetic field, and a force along the optical axis is generated for the second magnetic block 422, thereby driving the lens assembly 2 to move.

Figure 2:
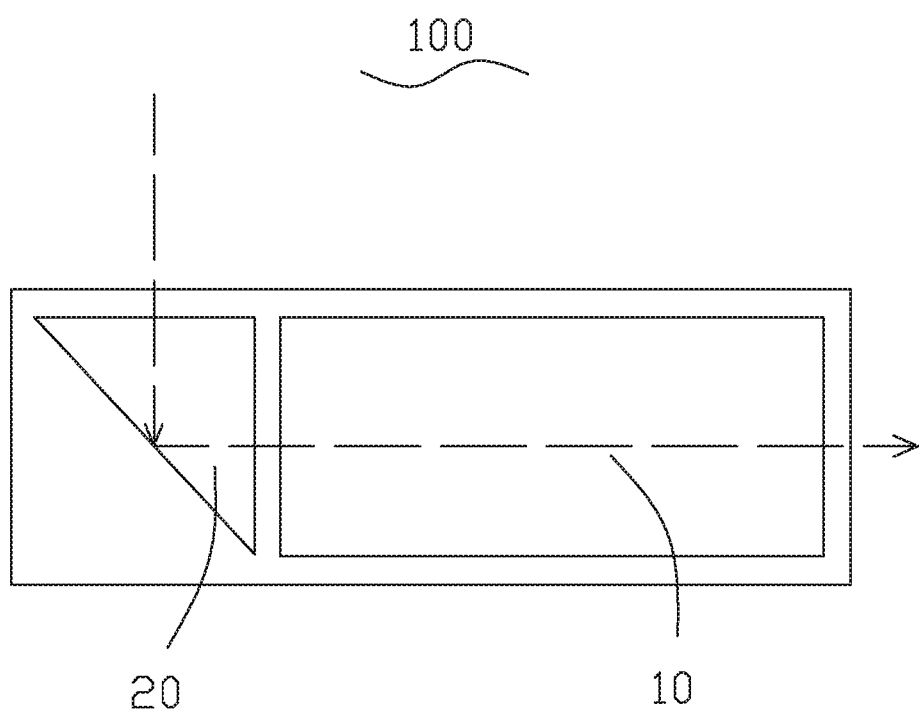
FIG. 2 is a diagram showing an internal light path of a periscope camera lens.
Figure 3:
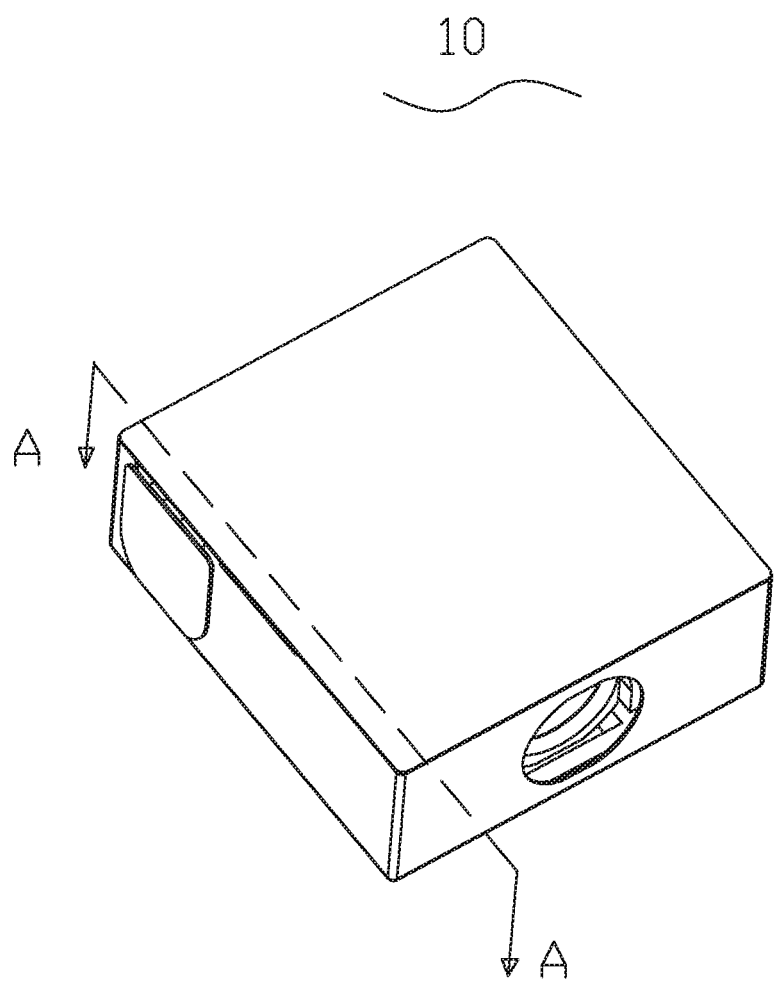
FIG. 3 is a schematic diagram of a structure of a camera module according to an embodiment of the present invention.

The present invention further provides a periscope camera lens 100. With reference to FIG. 1 to FIG. 2, the periscope camera lens 100 includes the camera module 10 described above and a prism module 20 provided at an end of the camera module. A dotted line with arrows shown in FIG. 2 shows an optical path of the periscope camera lens 100, and a direction of the arrows represents an irradiation direction of light.

In the camera module 10 according to this embodiment, a focusing and image stabilization driving system uses two groups of electromagnetic structures that are symmetrically distributed, thereby preventing the lens assembly 2 from deflecting.

The first magnet 312 and the second magnet 322 attract each other to form a magnetic spring. When the lens assembly 2 translates, the two magnetic magnets can generate a restoring force. The magnetic spring is shared by a focusing direction and an image stabilization direction, thereby saving an inner space. The ball 33 is tightly pressed by the two magnetic magnets, and plays a role of supporting and rolling. Moreover, the ball 33 will be located at a median line of the first magnet 312 and the second magnet 322 under an action of the magnetic field, thereby restoring the lens assembly 2. This design is convenient in terms of assembling and has an excellent restoring effect.

The above description merely illustrates some embodiments of the present invention. It should be noted that those skilled in the art can make improvements without departing from a creative concept of the present invention, but all these improvements shall fall into a scope of the present invention.

What is claimed is:

1. A camera module, comprising:
   a shell having a receiving cavity;
   a lens assembly provided in the receiving cavity and movable relative to the shell;
   at least one focusing and driving assembly provided in the receiving cavity and configured to drive the lens assembly to move in a direction of an optical axis;
   at least one image stabilization and driving assembly provided in the receiving cavity and configured to drive the lens assembly to move in a first direction perpendicular to the optical axis; and
   at least one supporting and guiding assembly provided in the receiving cavity and configured to support the lens assembly and guide a movement of the lens assembly,
   wherein each of the at least one supporting and guiding assembly comprises a first magnetic portion fixed to the lens assembly, a second magnetic portion fixed to the shell and spaced from and opposite to the first magnetic portion, and a ball provided between the first magnetic portion and the second magnetic portion; the lens assembly is connected to the shell through the at least one supporting and guiding assembly in a rollable way; the first magnetic portion and the second magnetic portion mutually attract in a direction perpendicular to the optical axis and the first direction in such a manner that the lens assembly is suspended in the receiving cavity; and the ball is rollable between the first magnetic portion and the second magnetic portion to guide the lens assembly;
   wherein an avoiding groove is formed by recessing from a side of the first magnetic portion and/or the second magnetic portion close to the ball along a direction facing away from the ball, and the ball is received in the avoiding groove and is rollable in the avoiding groove;
   wherein the first magnetic portion comprises a first supporting portion fixed to the lens assembly and a first magnet embedded into the first supporting portion; the second magnetic portion comprises a second supporting portion fixed to the shell and a second magnet embedded into the second supporting portion; and the ball is arranged between the first supporting portion and the second supporting portion, and the avoiding groove is formed in the first supporting portion and/or the second supporting portion;

wherein the lens assembly comprises a bracket spaced apart from the shell and a lens module mounted to the bracket, and the first magnetic portion is fixed to the bracket;

wherein the first supporting portion is formed on the bracket and formed into one piece with the bracket, and/or the second supporting portion is formed on the shell;

wherein the bracket comprises supporting arms that are opposite to and spaced apart from each other in the first direction, and bottom arms connected between the supporting arms, and the lens module is supported by the bottom arms and is located between the supporting arms;

wherein a first receiving groove is formed by recessing from a side of each of the supporting arms facing away from the second magnetic portion, and each of the at least one image stabilization and driving assembly comprises: a first magnetic block fixed to the first receiving groove, and a first coil fixed to the shell; and the first coil cooperates with the first magnetic block to drive the lens assembly to move in the first direction;

the at least one image stabilization and driving assembly comprises two image stabilization driving assemblies that are symmetrically distributed at two sides of a central axis of the lens assembly;

a second receiving groove is formed by recessing from a side of each of the supporting arms facing away from the lens module, and each of the at least one focusing and driving assembly comprises: a second magnetic block fixed to the second receiving groove, and a second coil fixed to the shell; and the second coil cooperates with the second magnetic block to drive the lens assembly to move along the optical axis of the lens assembly;

the at least one focusing and driving assembly comprises two focusing and driving assemblies that are symmetrically distributed at both sides of the central axis of the lens assembly; and the first receiving groove is perpendicular to the second receiving groove.

2. The camera module as described in claim 1, wherein the at least one supporting and guiding assembly comprises an even number of supporting and guiding assemblies, which are equally divided into two groups of supporting and guiding assemblies, and the two groups of supporting and guiding assemblies are symmetrically distributed at two sides of a central axis of the lens assembly.

3. The camera module as described in claim 1, wherein each of the first magnet and the second magnet has a cylindrical shape, and in an initial state, both a central axis of the first magnet and a central axis of the second magnet pass through a center of the ball and are perpendicular to the optical axis of the lens assembly.

4. A periscope camera lens, comprising:
a camera module; and
a prism module provided at an end of the camera module, wherein the camera module comprises:
a shell having a receiving cavity;
a lens assembly provided in the receiving cavity and movable relative to the shell;
at least one focusing and driving assembly provided in the receiving cavity and configured to drive the lens assembly to move in a direction of an optical axis;
at least one image stabilization and driving assembly provided in the receiving cavity and configured to drive the lens assembly to move in a first direction perpendicular to the optical axis; and
at least one supporting and guiding assembly provided in the receiving cavity and configured to support the lens assembly and guide a movement of the lens assembly, wherein each of the at least one supporting and guiding assembly comprises a first magnetic portion fixed to the lens assembly, a second magnetic portion fixed to the shell and spaced from and opposite to the first magnetic portion, and a ball provided between the first magnetic portion and the second magnetic portion; the lens assembly is connected to the shell through the at least one supporting and guiding assembly in a rollable way; the first magnetic portion and the second magnetic portion mutually attract in a direction perpendicular to the optical axis and the first direction in such a manner that the lens assembly is suspended in the receiving cavity; and the ball is rollable between the first magnetic portion and the second magnetic portion to guide the lens assembly;

wherein an avoiding groove is formed by recessing from a side of the first magnetic portion and/or the second magnetic portion close to the ball along a direction facing away from the ball, and the ball is received in the avoiding groove and is rollable in the avoiding groove;

wherein the first magnetic portion comprises a first supporting portion fixed to the lens assembly and a first magnet embedded into the first supporting portion; the second magnetic portion comprises a second supporting portion fixed to the shell and a second magnet embedded into the second supporting portion; and the ball is arranged between the first supporting portion and the second supporting portion, and the avoiding groove is formed in the first supporting ortion and/or the second supporting portion;

wherein the lens assembly comprises a bracket spaced apart from the shell and a lens module mounted to the bracket, and the first magnetic portion is fixed to the bracket;

wherein the first supporting portion is formed on the bracket and formed into one piece with the bracket, and/or the second supporting portion is formed on the shell;

wherein the bracket comprises supporting arms that are opposite to and spaced apart from each other in the first direction, and bottom arms connected between the supporting arms, and the lens module is supported by the bottom arms and is located between the supporting arms;

a first receiving groove is formed by recessing from a side of each of the supporting arms facing away from the second magnetic portion, and each of the at least one image stabilization and driving assembly comprises: a first magnetic block fixed to the first receiving groove, and a first coil fixed to the shell; and the first coil cooperates with the first magnetic block to drive the lens assembly to move in the first direction;

the at least one image stabilization and driving assembly comprises two image stabilization driving assemblies that are symmetrically distributed at two sides of a central axis of the lens assembly;

wherein a second receiving groove is formed by recessing from a side of each of the supporting arms facing away from the lens module, and each of the at least one focusing and driving assembly comprises: a second magnetic block fixed to the second receiving groove, and a second coil fixed to the shell; and the second coil cooperates with the second magnetic block to drive the lens assembly to move along the optical axis of the lens assembly;

the at least one focusing and driving assembly comprises two focusing and driving assemblies that are symmetrically distributed at both sides of the central axis of the lens assembly; and the first receiving groove is perpendicular to the second receiving groove.

5. The periscope camera lens as described in claim 4, wherein the at least one supporting and guiding assembly comprises an even number of supporting and guiding assemblies, which are equally divided into two groups of supporting and guiding assemblies, and the two groups of supporting and guiding assemblies are symmetrically distributed at two sides of a central axis of the lens assembly.

6. The periscope camera lens as described in claim 4, wherein each of the first magnet and the second magnet has a cylindrical shape, and in an initial state, both a central axis of the first magnet and a central axis of the second magnet pass through a center of the ball and are perpendicular to the optical axis of the lens assembly.

\* \* \* \* \*